Dec. 5, 1933.  D. H. NELLES ET AL  1,937,711

METHOD OF MAKING TOPOGRAPHICAL MAPS

Filed Dec. 12, 1930  2 Sheets-Sheet 1

INVENTORS:
D. H. Nelles
J. O. Fortin

By: Marks & Clerk

ATTORNEYs

Dec. 5, 1933.　　　　D. H. NELLES ET AL　　　1,937,711
METHOD OF MAKING TOPOGRAPHICAL MAPS
Filed Dec. 12, 1930　　2 Sheets-Sheet 2
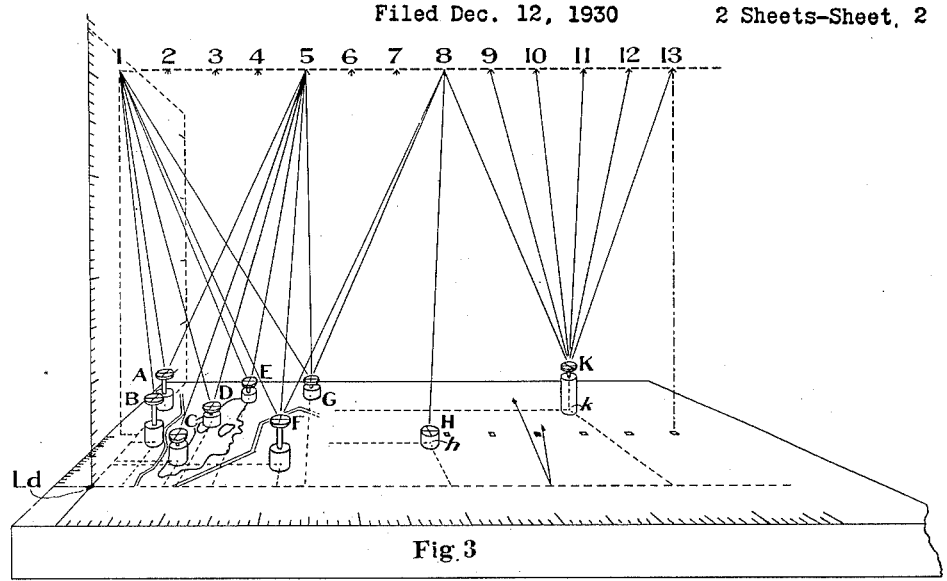
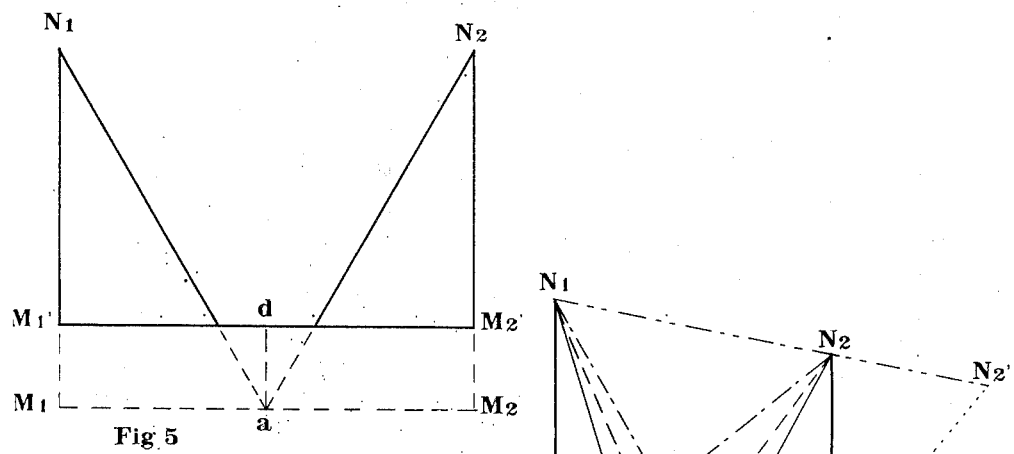
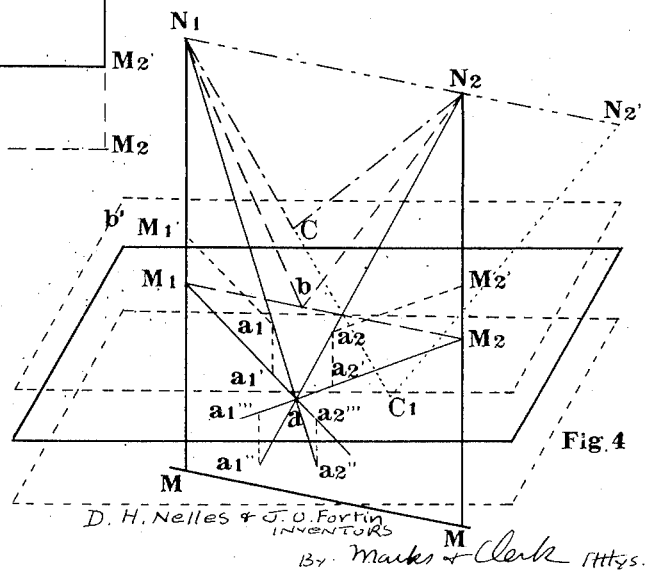

Patented Dec. 5, 1933

1,937,711

UNITED STATES PATENT OFFICE 1,937,711

METHOD OF MAKING TOPOGRAPHICAL MAPS

Douglas Henry Nelles and Joseph Ovila Fortin, Ottawa, Ontario, Canada

Application December 12, 1930
Serial No. 501,957

2 Claims. (Cl. 33—1)

Our invention relates to a method of making topographical contoured maps from the original aerial photographic negatives or from positives made from the original negatives, exposed in a hydroplane, aeroplane or airship.

The object of our invention is to provide a method of correlating flying, exposure and plotting in such a manner that we can produce an accurate topographical contoured map, the cost of which will be low enough to make the method commercially feasible.

An important object of the invention is to provide a method whereby the negatives may be accurately and quickly set up for plotting in the same relationship to each other and to the plotting board as they had to each other and to the ground at the instant of exposure.

The present invention consists in the operations hereinafter fully described and more particularly pointed out in the appended claims.

Figure 1:
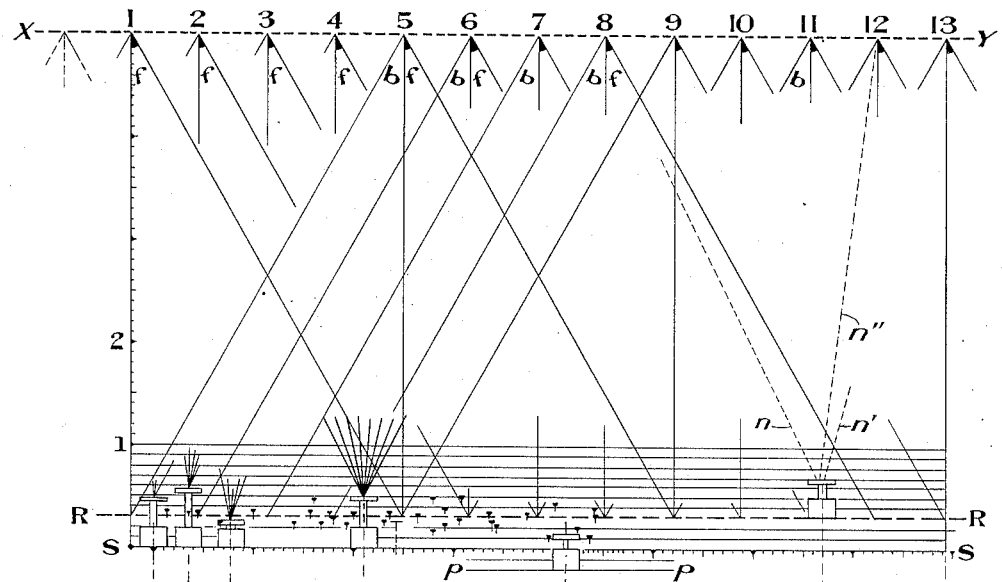
Figure 2:
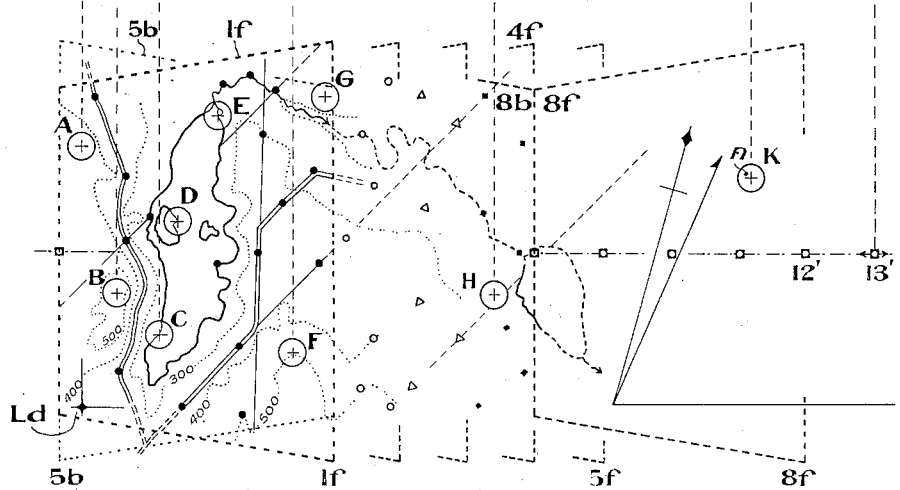

Figure 1 shows diagrammatically in section the relative positions of the air stations or the front nodal points of the plotting lenses and the control point posts A, B, C, F, H, and K, as projected up from the plan view shown in Figure 2. Control point posts H and K are shown at different settings of the plotting board from each other and from A, B, C and F as they are not registered in the negatives $1f$ and $5b$ which photographed the others. In this drawing the tilt angle is shown as being equal to half the camera angle. This figure shows part of a map in the process of being drawn by our method. A, B, C and F show the relative positions of the control points used to locate the air positions of negatives $1f$ and $5b$, the projected outlines of which are shown in dotted lines. The corners of the projections of negatives $2f$, $3f$, $4f$ and $5f$ are shown and $8f$ in full. Photographically plotted points are shown by circles and triangles to be used for control points as the plotting progresses. A lake, a road and some contours are also shown.

Figure 3 is a perspective view of air stations 1, 2, 3, etc. over a plotting board SS' showing control point posts A, B, C, D, E, F, G, and K. Figure 4 illustrates a method of plotting by polar lines and coincidence, and Figure 5 is a geometrical figure showing quantities for calculating elevations under certain conditions arising in our method of plotting.

The first operation is to expose two aerial negatives over approximately the same area of the earth's surface, located in such a way that the negative perpendiculars are slightly deviated from, or make an oblique angle with, the plumb line, the angle of each negative being approximately the same, but inclined in the opposite direction in the line of flight. In Figure 1, the line X—Y may be taken to represent diagrammatically the line of flight, the numerals 1 to 13 indicating the stations at which successive exposures are made. The angles $b$ and $f$ represent the backward and forward exposures respectively, and it will be seen that the exposures are so timed and arranged that exposure $1f$ covers the same area as $5b$, $2f$ the same area as $6b$ etc.

In the exact determination of the air position of a negative our first operation is to pick out clearly defined points, four of which lie near the four corners of the negative. All points chosen must of course have been previously plotted on the plotting board, either from ground or aerial survey. Their elevation either above mean sea level or relative elevations in regard to each other must also be known. We then take an opaque sheet of paper the size of the negative and make a mask by cutting small holes just large enough that the control points and their immediate vicinity will be projected on the plotting board. Cutting out the light from the rest of the negative gives a clearer definition to the eye and enables a quicker and more accurate determination to be made. If any of the points are not clearly defined and are out of focus under the conditions of projection, we drill a small hole through the point and cut a small circle around the point taking care to cut through the emulsion only. In cutting the circle we project a tiny ray of light from the centre of the cutting circle of the cutting tool perpendicular to the negative surface. The spot light is easily adjusted over the exact point and the point and circle cut by pressing and turning a milled knob. The negative and mask are now put into the plotting camera. The lenses of the plotting cameras are of somewhat shorter focal length than the lenses of the aerial cameras and by using different focal length lenses we bring the projected negative to a sharp focus at different distances from the lens, thereby having a choice of scales on which to plot the map. The back node of the plotting lens is placed at the same distance from the negative as the back node of the aerial lens. The plotting lenses are chosen or designed so that the distance between the back and front node of the lens is the same, or nearly so, as this distance in the aerial lens used. Under these conditions the projected ray of light from the plotting camera of any one point will sustain the same regular relationship to the negative perpendicular as the ray which formed the point in the aerial camera. If the distances between the nodal points in the aerial and the plotting lenses are different then the ray coinciding with the negative perpendicular will be the same but away from it. There will be a change in the direction of the ray swinging in concentric circles and increasing as the distance from the centre towards the edge of the negative is increased.

That part of the determination of the air position concerned with the plotting camera is accomplished under one condition and six movements. Each movement is measured and recorded for future use. The condition is that the negative in the plotting camera shall sustain the same relationship to the lens as it did to the lens of the aerial camera, except when the film has shrunk then the distance is slightly changed to compensate for shrinkage.

That is, the distance from the back node of the lens to the surface of the negative shall be the same and the surface of the negative shall be at right angles to the optical axis of the lens. Three measurements relate to the position of the front node of the lens and its position is the air station. The plotting camera is mounted on a bridge along which it can be moved, the movement is parallel to the departure scale of the plotting board and is measured by a scale on the bridge whose zero during movement of the bridge itself is vertically over the latitude scale line and its measurement is called "departure". The bridge itself moves sideways on a supporting frame in a direction at right angles to the camera movement on the bridge. The bridge movement is recorded as a latitude measurement and is measured by a scale on the supporting frame which is parallel to the latitude scale on the plotting board, the point which measures the bridge movement as well as that of the camera carriage being the front nodal point of the plotting lens. The supporting frame moves vertically and this movement is recorded by a vertical scale whose zero represents mean sea level, or an arbitrary datum, the front node of the lens being the point recorded. All the above scales are natural scales either feet and decimals or meters and decimals. The transfer of the measurements to the scale of the map is done by mathematical, mechanical or graphical means, or by a combination of these three. The other three measurements relate to the negative's position as swinging around with the front node of the lens as a pivot. The plotting camera is suspended on an axis which is attached to the carriage which slides on the bridge. The centre of the axis passes through the front node of the lens. When the plotting camera swings on this axis, the negative perpendicular makes an angle with the plumb line passing through the front node of the lens. This angle is measured by a graduated quarter circle and recorded in degrees, minutes and seconds. When the plotting camera is tilted a vertical plane is formed called the "tilt plane" fronting on the plumb line passing through the front node of the lens and passing through the negative perpendicular. The camera and its supporting axis are fitted to swing in a semi-circle on the carriage about the aforementioned plumb line as a centre, and the angle the tilt plane makes with a horizontal line passing the front node of the lens and parallel with the latitude line, is measured by a graduated semi-circle and recorded in degrees, minutes and seconds. The sixth movement is called the rotation angle and is a movement of the negative itself in the focal plane rotating about its own centre. The movement is measured by a graduated circle having as its zero the tilt plane and for the vernier zero, the principal collimating line of the negative and is recorded in degrees, minutes and seconds.

The next procedure is to plot the position of the ground control points on the plotting board by latitude and departures on the scale decided upon. Referring to Figure 3, the latitude scale is indicated on the front of the board and the departure scale on the left edge. A movable latitude scale $d0$ is indicated. This scale slides over the board parallel to the left edge and at right angles to the latitude scale. The vernier that is used for reading the decimals of a division of its scale is attached to the part that slides over the latitude scale. The departure scale is on a beam $d0$ which slides lengthways across the plotting board so that by these two movements its end can be placed in any position on the plotting surface of the plotting board so that by these two movements its end can be placed in any position on the plotting surface of the plotting board. The latitude and departure of any point on the plot is measured by setting the end of the departure beam, that is its zero point, at the point to be measured and then reading the two verniers, one of which records the position of the zero line on the beam in relation to the latitude scale. We take a number of the small spool-shaped control point posts shown in Figures 1, 2 and 3, the bottoms of which have right angled marks so that their centres can be placed exactly over the control point. The top is preferably white having the centre suitably marked and is capable of being adjusted in height. The first control point post to be placed is set at the lowest limit that its height can be adjusted to and placed over the control point having the lowest elevation. As each of the other control point posts is placed over a control point the top is set at such a height that the difference between its height and the height of the first placed control point post (using the scale of the map) is equal to the difference in elevation between the lowest elevation control point and the elevation of the control point whose post is being placed in position. The points on the top of the control point post now represent the control points and are perpendicularly over the control points as plotted on the plotting board, which is now set in elevation so that the tops of all control point posts are in elevation to scale and in relation to each other and to the plane passing through the zero of the elevation scale as were the points they represent in the elevation above an arbitrary datum elevation plane or above mean sea level.

Everything now being ready the light is turned on in the plotting camera with the result that small shafts of light with the control points in the centre are projected upon the plotting board. The plotting camera is then adjusted in departure, latitude and elevation, the tilt angle adjusted from the set tilt if necessary, the bearing adjusted and the negative rotated about its centre, until the actual images of the control points or the point of clear light coincide with the control points as represented by the top of the control point posts. When this is accomplished the negative has the same angular relationship to the control points as represented by the top of the control point posts as it had in the aerial camera at the instant of exposure to the points themselves on the ground; and the front node of the plotting lens has the same angular and distance relationship to scale, to the control points as represented by the top of the control point posts, as the front node of the aerial lens had to the points themselves on the ground. The determination of the air position of one negative of a plotting pair is now finished. If the six scales are now read and recorded, the negative can be removed and put back in the same position at any time in the future that it is necessary to use it. The second negative of the plotting pair has its air position determined in a similar manner, the plotting board and control point posts being left in the same position until this is accomplished. In our method of determining an air position we cannot use less than three control points, but the greater number than three that we can use is limited only by the space on the plotting board on which we can crowd control point posts, the practical number is between four and eight. Other experimenters who rectify their negatives are limited to the set number of three control points as their points are plotted on a plane and a plane cannot be put through more than three points of unequal elevation.

For measuring the co-ordinates of plotted points or for setting control point posts in position we have two beam scales. As already mentioned the latitude scale beam is made adjustable and is shown in Figure 3, at d0. It slides up and down the beam measuring latitude; one end of this beam has a semicircular opening and the zero of the graduated scale on the beam is the centre of the semicircle, so that while the scale is used for measuring distances away from the latitude line the graduations are reversed and the vernier attached to the slide of the latitude beam. When plotting a point a circular disk is put in the semicircular end of the departure beam, the beam set in latitude and departure of the point, whose position is marked through a hole in the centre of the disk. Control point posts are set in position either by drawing two right angled lines through the point and setting the post by right angled registration marks on the base, or by setting the departure beam in latitude and departure and putting the circular base of the post into semicircular end of the beam and then withdrawing the beam without disturbing the post.

When the control point posts have fulfilled their function of helping to establish the air positions of a plotting pair of negatives and of placing the plotting cameras in the plotting position, the posts may be taken off the plotting board. It will be seen that as the plotting cameras have been placed to scale geometrically to each other as were the aerial cameras at the instant of exposure and as the rays to any particular point are projected to scale with the same geometrical relationships to each other as when they entered the aerial cameras at the instant of exposure, they will intersect in space at a point corresponding to scale, to the position of the point on the ground. Now when we determined the position of plotting cameras and negatives in our plotting instrument we set the control point posts to scale in their relative position to each and their tops in relative elevations. The surface of the plotting board is a horizontal plane which can be moved vertically and is set so that the tops of the control point posts are in the same relation to the zero of the vertical scale as the points on the ground were above mean sea level. The control point posts are shown in elevation in Figure 1, and in perspective in Figure 3, and their relative spacing in plan in relationship to size of projected negative in Figure 2. When the positions of the plotting cameras are fixed from these points they will also, to scale, be in elevation above the zero of the elevation scale as the aerial cameras were at the instant of exposure above mean sea level. To plot any point all that is necessary to do is to move the plotting board up or down until the rays of any particular point from both plotting cameras intersect or coincide and if the elevations are read off the vertical scale as previously described, the elevation of the point is determined.

This general method is simple in principle but we had to overcome certain practical difficulties before our method became commercially economical. We found that if we used a different coloured light in each plotting camera or a negative in one camera and a reversed positive in the other the results were that when an object was approaching coincidence there would be a thin strip of the light of one colour on one side and a thin strip of the other coloured light on the other. In between the two thin strips would be a neutral colour. When the thin strips of colour above mentioned disappear and become neutral then the object is in coincidence and its position and its elevation determined.

If plotting by coincidence as above described fails to plot accurately through want of definition caused by the depth of focus not being sufficient we use the following method by which we can plot with the data taken from the point when in position of exact focus. First we mark the map plumb point on the plotting board for each plotting camera. This point is situated where a perpendicular through the front node of the plotting camera lens N1 and N2, Figure 4, cuts the plane of the plotting board at M1 and M2, M M being the mean sea level plane or any arbitrary plane chosen as the datum plane for elevations. In Figure 4, we want to plot point $a$ but we will suppose that it is so much out of focus that coincidence cannot be obtained. We first raise the board until point $a$ projected from N2 is in exact focus at $a2$. The elevation scale is then read and the point marked on the map and in reference to $a$, it will be at $a2'$, $a1'$ is then found in a similar manner. When M2 $a2'$ and M1 $a1'$ are drawn and produced to intersection at $a$, $a$ will be the true position of the point. We call M1 $a1'''$ and M2 $a2'''$ polar lines because all similar plotting lines radiate from M1 and M2 as polar points. As M2 N2 and M1 N1 are vertical lines M2 $a$ N2 and M1 $a$ N1 are vertical planes; therefore the lines M2 $a$ and M1 $a$ are traces of the lines $a$ N2 and $a$ N1 and when the plotting board is moved up and down the projection of point $a$ from N2 will trace the line $a2'''$ M2 and the projection of $a$ from N1 will trace the line $a1'''$ M1 and their intersection $a$ is the true position of the point. In Figure 16, the vertical triangles $a$ $a2$ $a2'$ and $a2$ N2 M2' are similar triangles, therefore we have the proportion (M2' $a2$) is to ($a2'$ $a$) as (N2 M2) is to ($a2$ $a2'$). After the point $a$ is plotted we can measure M2', $a2$ and $a2'$ $a$ off the map and the points N2 and M2' are read off the vertical scale so that the line N2 M2' is known and $a2$ $a2'$ can be calculated. $a2$ $a2'$ is then subtracted from the scale reading at M2' and the result is the scale reading at M2 which is the elevation of the point $a$. We call this the "polar line" method of plotting.

In a similar manner most of the points needed for the map shown in the negatives can be plotted and their elevation determined but as the point approaches the line M1 M2 or a projection of it, and the angle M1 $a$ M2 approaches 180 degrees the position determination will become less accurate and when on the line M1 M2 will be unplottable by the polar line method. Therefore for points on or near the base line we can use a method in which the point is set at or near exact focus at $a1$ and $a2$ in Figure 5, N1 and N2 are the front node points of the lens and M1 and M2 and also M1' and M2' are map plumb points. We can measure M1' $a1$ and M2' $a2$ off the map and N1 M1' and N2 M2' are obtained from the vertical scale readings. M1' and M2' are right angles so that the angles at N1, N2, $a1$ and $a2$ can be calculated. We therefore have $$a1 = 90 - N1 \qquad \tan a1 = \frac{N1\ N1'}{M1'\ a1}$$
$$a2 = 90 - N2$$
$$a = N1 + N2 \qquad \tan a2 = \frac{N2\ M2'}{M2'\ a2}$$

and
$$a1\ a = a1\ a2 \sin a2 \operatorname{cosec} a$$
and
$$a' = 90 - a1$$
therefore
$$a1\ d = a1\ a \sin a'$$

and the position of point $a$ is plotted at $d$. When point $a$ is slightly off the line M1 M2, but not far enough to make an accurate plot by intersection its position can be calculated as above by considering $a1\ a2$ as a straight line.

A shorter way of determining the position of point $a$, or of $d$ which is the same point, is as follows: Triangle N1 M1' $a1$ is similar to $a\ d\ a1$ and triangle N2 M2' $a2$ is similar to $a\ d\ a2$; therefore we have the proportion of M1 $a1$ plus $a2$ M2' is to $a1\ a2$ as M1' $a1$ is to $a1\ d$. $a1\ d$ is the unknown and its determination fixes the position of $a$.

There have been a number of methods devised to make topographical maps from air photographs, but the apparatus has been costly, the methods cumbersome and involving long calculations. What we have accomplished by our invention is to provide a system by which positions and elevations of points necessary to construct a map can be determined from air photographs in a simple, accurate and commercially economical manner. To obtain these results, we have had to devise many little details which we have fully described. Many of these details can be worked out in different ways and we do not wish to be understood as limiting ourselves to any particular type of construction of apparatus.

In the claims the term "photograph" is employed for convenience of description to refer to the plate or film before or after exposure, or before or after development, and the meaning of the term in each instance will be clear from the context in which it occurs.

What we claim is:—

1. A method of producing topographical maps which comprises photographing an area of ground from two positions, selecting points of known position and elevation in said photographs, plotting the positions of said points in latitude and departure on a plotting board to any desired reduced scale, placing control point posts on said plotted points, adjusting the height of said posts to the elevation of the points on the same scale, and determining the air position of the photographs at the time of exposure, at the same reduced scale, by projecting light through said photographs and adjusting the position of the photographs until the projected images of the selected points coincide on said control point posts.

2. A method of producing topographical maps which comprises photographing an area of ground from two positions, selecting points of known position and elevation in said photographs, plotting the positions of said points in latitude and departure on a plotting board to any desired reduced scale placing control point posts on said plotted points, adjusting the height of said posts to the elevation of the points on the same scale, and determining the air position of the photographs at the time of exposure, at the same reduced scale, by projecting light through said photographs and adjusting the position of the photographs until the projected images of the selected points coincide on said posts, then selecting points in the photographs of unknown position and elevation, adjusting the plotting board until the luminous images of the last mentioned points are in focus on the board, marking on the board polar points vertically beneath the front nodes of the lenses, and determining the position of the points of unknown position by the intersection of straight lines passing through the polar points and the respective luminous images.

DOUGLAS HENRY NELLES.
JOSEPH OVILA FORTIN.